United States Patent [19]

Ikehama

[11] Patent Number: 5,771,436
[45] Date of Patent: *Jun. 23, 1998

[54] SATELLITE COMMUNICATIONS MULTI-POINT VIDEO TRANSMIT SYSTEM

[75] Inventor: Satoshi Ikehama, Tokyo, Japan

[73] Assignee: Hitachi, Ltd., Tokyo, Japan

[*] Notice: The term of this patent shall not extend beyond the expiration date of Pat. No. 5,555,443.

[21] Appl. No.: 689,058

[22] Filed: Jul. 30, 1996

Related U.S. Application Data

[63] Continuation of Ser. No. 41,968, Apr. 2, 1993, Pat. No. 5,555,443.

[30] Foreign Application Priority Data

Apr. 3, 1992 [JP] Japan .................................. 4-082152

[51] Int. Cl.$^6$ .................................................... H04N 7/14
[52] U.S. Cl. .............................. 455/12.1; 348/15; 348/16
[58] Field of Search ................................ 455/12.1, 13.1, 455/3.1, 4.1, 5.1, 6.1; 348/13, 14, 15, 16; 379/202, 203, 204

[56] References Cited

U.S. PATENT DOCUMENTS 4,965,819 10/1990 Kannes ...................................... 348/15
5,003,532 3/1991 Ishida ....................................... 348/15
5,225,902 7/1993 McMullan, Jr. ......................... 455/5.1
5,325,194 6/1994 Natori et al. ............................. 348/15
5,555,443 9/1996 Ikehama ................................ 455/12.1

FOREIGN PATENT DOCUMENTS 2238691 6/1991 United Kingdom .

Primary Examiner—Reinhard J. Eisenzopf
Assistant Examiner—Thanh Le
Attorney, Agent, or Firm—Antonelli, Terry, Stout, & Kraus, LLP

[57] ABSTRACT

A satellite communications multi-point video transmit system is provided which employs a satellite link and a hybrid system of a terrestrial line and is economical. Further, a system configuration is provided for matching a view point of a speaker to a camera. The multi-point video transmit system includes a transmission path composed of a satellite link for transmitting a video signal from a center station and a terrestrial line for transmitting a video signal from a remote station. In the center station, the image from the remote station is synthesized with the image of the center station and the synthesized image is transmitted. The center station and remote stations further may have prompter cameras for matching the directions of view of speakers to their cameras.

5 Claims, 5 Drawing Sheets

SATELLITE COMMUNICATIONS MULTI-POINT VIDEO TRANSMIT SYSTEM

This application is a Continuation of application Ser. No. 08/041,968, filed Apr. 2, 1993 U.S. Pat. No. 5,555,443.

CROSS-REFERENCE TO RELATED APPLICATIONS

This application relates to U.S. applications Ser. No. 07/913,489 filed on Jul. 15, 1992, Ser. No. 07/913,402 filed on Jul. 15, 1992 and Ser. No. 07/913,403 filed on Jul. 15, 1992 and assigned to the assignee of this application. The contents of these applications are incorporated by reference herein.

BACKGROUND OF THE INVENTION

The present invention relates to a multipoint TV presentation to be carried out mainly through a satellite link, and more particularly to a satellite communications multi-point video transmit system which may apply to applications for remote educational systems, each having the same configuration, a TV presentation or a teleconference, and several kinds of inquiries.

A multipoint TV presentation to be carried out through a satellite link has been proposed. It, however, has employed a system for transmitting a video signal between terminals directly through the satellite, as disclosed in JP-A-2-65426 and JP-A-2-73758. Hence, the earth station needs to be of the very costly transmit/receive type. This leads to an increase in the cost of the overall system.

The conventional TV presentation has been arranged in such a manner that a camera is not matched in position to a monitor in the equipment. This arrangement incurs a shortcoming that a user's view is not directed to the camera, but is directed to the monitor. Further, when speech is transmitted through the satellite link, the speech is subject to howling due to interference with the speech from the source. This also incurs another promotional shortcoming that the howling distracts the speaker and makes it difficult to speak.

SUMMARY OF THE INVENTION

It is an object of the present invention to provide a satellite communications multi-point video transmit system which is capable of reducing the promotional cost of the overall system in a multipoint TV presentation to be executed through a satellite link.

It is a further object of the present invention to provide a satellite communications multi-point video transmit system which provides the capability of overcoming a lower vivid presence than an actual conversation because of the mismatch of a speaker's point of view to a camera.

It is another object of the present invention to provide a selecting device at a speaking station which provides a function of holding and selecting a feedback video/audio signal if two or more terrestrial lines are connected to a center station and a function of controlling a feedback voice not to be given to a selected remote station through a satellite.

According to an aspect of the invention, in case of a multipoint teleconference to be executed among a plurality of stations, normally, one station is assigned as a center station in which the state of the proceedings are controlled. The stations, except, the center station, then, have to wait for their turn to communicate. That is, a terminal transmits a video signal to the center station by a terrestrial line, such as an ISDN line, so that the image is synthesized on the image of the center station. Then, the center station transmits the synthesized image to another station through the satellite link. Those remote earth stations, therefore, just need to be receive only type stations. This results in a reduction in the cost of the overall system in comparison with the installation of send/receive type earth stations. Further, the use of a communication charge per a given rate in the ISDN makes it possible to reduce the running cost.

To match a speaker's point of view to the camera, it is possible to install means, such as a prompter camera, in a manner that a monitor for displaying an image of a user may be matched to the position of the camera. There has been already developed such a prompter for projecting a manuscript on the front surface of the camera.

According to another aspect of the invention, the prompter camera is used in place of a camera used for the teleconference so that a manuscript may be displayed on the monitor of the prompter camera.

According to another aspect of the invention, when a request for speech is issued from a plurality of remote stations at the same time and is transmitted to the center station through a terrestrial line, the center station needs to sequentially pick up the request if necessary and permit one remote station to speak at a time. The speaker's voice of the permitted remote station is fed back from the center station to its own station through the satellite link. Hence, the permitted station needs to perform shut-off or muting control of the feedback voice. The center station provides a speaker's station selecting unit to properly function in this manner. Merely by selecting the speaker's station through the effect of the speaker's station selecting unit, the center station can output a video signal and an audio (speech) signal of the permitted station through the satellite link and automatically transmit a signal for performing muting control of a voice to the permitted station.

In a multipoint teleconference to be executed through satellite communications according to the present invention, only the center station in charge of the progress of proceedings is a send/receive type station. The image of a figure is transmitted from the center station to the remote stations in a broadcasting fashion. The image of an attendant in the teleconference is transmitted from each remote station to the center station through a terrestrial line, such as an ISDN. In the center station, the image is synthesized with the other image of the center station and then the synthesized image is transmitted to all the remote stations through a satellite link. The remote stations, which occupy almost all of the overall system, are of a receive only type. This results in a reduction in the cost of the overall system. Herein, the transmission of a signal from the center station is referred to as an "uplink".

To hold a conversation with someone through the display, one has to say something to another person. In this state, it is inevitable that one watches the monitor on which another person is displayed. Hence, it is a prerequisite that the person's view is directed to the monitor. To meet the prerequisite, the monitor is required to be located at the same place as the camera for matching the person's view to the camera. To realize this location, a prompter camera is used in place of a normal camera provided in the TV presentation.

According to another aspect of the present invention, two or more remote stations issue requests for speaking to the center station through a terrestrial. To sequentially permit some of those remote stations to send speech, the center station holds the line for switching the line without any time lag. Further, a return voice from the satellite to the remote station which is permitted to send speech has to be cut, because the return, delayed, voice is an obstacle to clear speech and howling may take place in the permitted station. Hence, the center station is required to permit the remote station to send speech and perform shut-off control or muting control of the speech. These functions can be realized by providing a speaking station selecting unit in the center station in a manner for a user to select the speaking station with one touch and instantly perform such muting control.

BRIEF DESCRIPTION OF THE PREFERRED EMBODIMENTS

DESCRIPTION OF THE PREFERRED EMBODIMENTS

Now, the description will be directed to an embodiment of the present invention with reference to the accompanying drawings.

Figure 1:
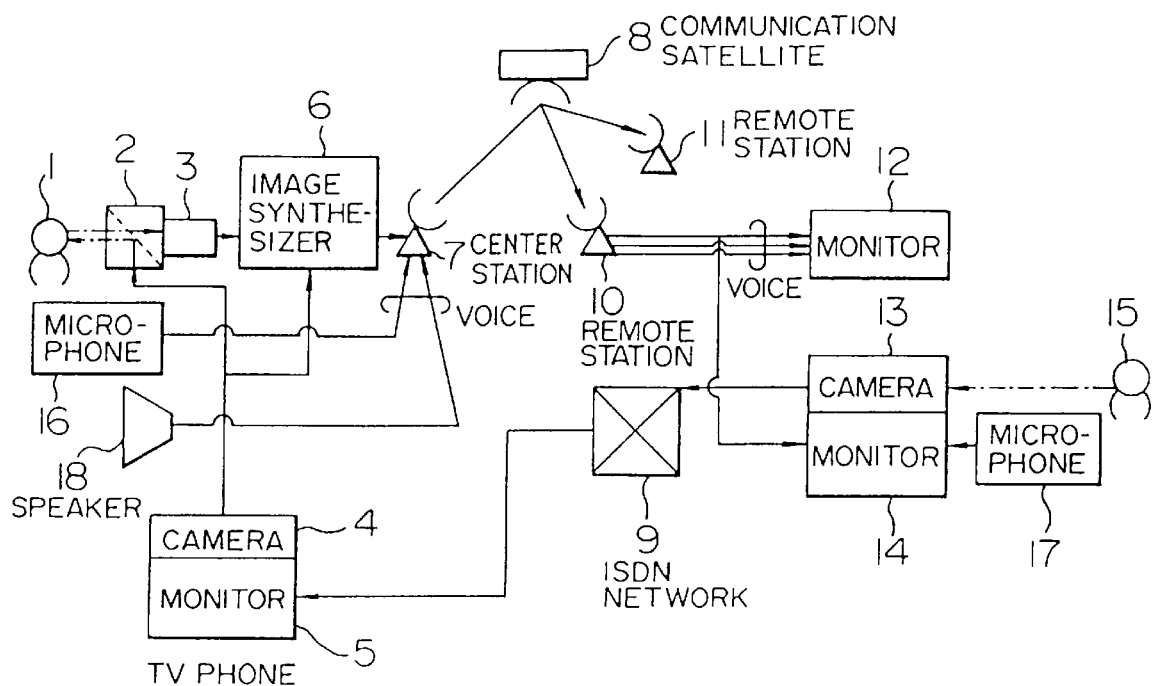
FIG. 1 is a block diagram showing an overall system according to an embodiment of the present invention.

FIG. 1 shows in block diagram a multipoint teleconference equipment configuration having a center station 7 and remote stations 10 and 11, the center station 7 having a chairman 1 for directing the progress of certain proceedings of the teleconference and the remote stations taking part in the teleconference. For holding a meeting, a date is transmitted to each station in advance. On set date, the meeting is held, during which the image and voice of the chairman 1 are transmitted to an earth station provided in the center station 7 through a camera 3 and a microphone 16. The earth station modulates the signal and broadcasts the modulated signal to each receiver in the remote stations 10 and 11 through a communication satellite (CS) 8. In each remote station, the received signal is demodulated into a video signal and an audio signal, specifically a speech signal, and then the signals are output to a monitor 12. At this time, the video signal is connected to an external video input terminal of a TV phone, such as the HV-100 manufactured by Hitachi, Ltd., so that the image is displayed on a monitor 14 of the TV phone. In the process of the teleconference, if a person 15 of the remote station 10 wants to speak, the TV phone provides dialling to the center station, so that a signal may be transmitted through an ISDN line. By lifting the receiver in the center station, the line is connected between the remote station 10 and the center station 7. Then, the image and the voice of the person 15 are sent to the TV phone of the center station through a camera 13 and a microphone 17 on the ISDN line. The image is displayed on the monitor 2 of the prompter camera and output to an image synthesizing unit 6. In the image synthesizing unit 6, the image is synthesized with the image of the chairman 1 and the synthesized image is sent to the modulator of the center station 7. On the other hand, the voice of the speaker 15 is monitored by a speaker 18 and is inputted to the center station as voice L. Assuming that the voice of the chairman 1 collected by the microphone 16 is voice R, the voice of the speaker 15 is broadcasted to all the remote stations together with his or her image. In each of the remote stations, except for the station from which the speaker 16 produces a speech, therefore, the remote station provides one image channel at which the image of the chairman 1 and the image of the speaker 15 are synthesized and a stereo voice channel at which the voices of the chairman 1 and the speaker 15 are assigned to L and R channels, respectively. Each remote station, therefore, can watch the image of both persons and listen to their conversation. When the speech supplied by the speaker 15 is terminated, by hanging up the receiver of the TV phone in the center station and the remote station, the ISDN line is disconnected. Then, the TV phone of the remote station 11 applies dialling to the center station so that a line is newly connected for continuing with the proceedings. As such, the images and the voices of the chairman 1 and the speaker of each remote station are switched in sequence and broadcasted to all the remote stations on the satellite link. Since the ISDN line is switched among the remote stations in sequence, the remote stations may be infinitely increased from a theoretical point of view. The cost of the line is defined on the basis of the meeting time without having to depend on the number of remote stations. Further, since the station is a receive-only type, the overall system is more economical than the expensive conventional sending and receiving station.

Figure 2:
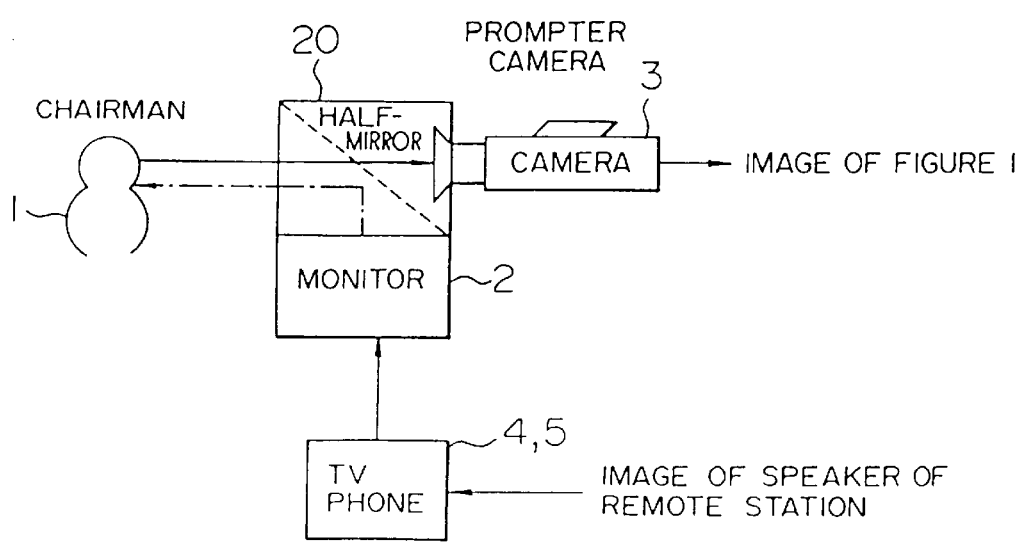
FIG. 2 is view showing a relation between a direction of view of a speaker and a prompter camera used in the present invention.

In turn, the description will be directed to how a direction of view is matched to a camera in this embodiment while referring to FIG. 2. FIG. 2 shows a relation among a speaker's image of a remote station transmitted on the ISDN line, a view direction of the chairman 1 and a prompter camera. The image of the speaker of the remote station is received by the TV phones 4 and 5 provided in the center station through the ISDN line as mentioned above. The received video signal is outputted from the video output terminal of the TV phone to the monitor 2 of the prompter camera and the image synthesizing unit 6. On the monitor 2 is displayed a speaker's image. The image is projected onto a half mirror 20 located in the upper part of the monitor 2 so that the chairman 1 may view the image of the speaker. On the other hand, the chairman 1 and the camera 3 are located on a line through the face of the chairman 1 and the half mirror 20. In this location, the chairman 1 can take part in the teleconference while viewing the image of the speaker. Hence, the view direction of the chairman 1 is directed to the camera 3 so that the image synthesizing unit 6 may output the synthesized result of the image of the chairman 1 facing toward the front and the image of the speaker.

The prompter camera may be provided also in the remote station. The output of the camera 3 is connected to the video input terminals of the TV phones 4 and 5 in a manner to allow the direction of view of the speaker to match that of the camera on the image.

The foregoing description has been directed particularly to a multipoint teleconference. The same system configuration may apply to other applications mainly based on an image broadcast, such as a remote educational system or a unidirectional local information communications system. For the remote educational system, by replacing the chairman. 1 with a tutor, remote education can be supplied to a plurality of remote classrooms. If a student wants to ask the tutor a question, the student can ask the tutor a question through the TV phone. Like the foregoing system, all other remote classrooms can watch the images of the tutor and the student on display screens and listen to the question and the response. In addition, a system dedicated to image broadcast is allowed to be easily expanded to a system according to the present invention.

In the foregoing embodiment, the TV phone, the prompter camera and the image synthesizing unit are independent units. It is possible to provide a unit having those functions integrated therein for achieving a system by simple arrangement having a receive only station and the function-integrated unit itself. Further, it is also possible to change the connecting arrangement between the units, if necessary, so that it may be used as a center device, a remote device or a mere device for a terrestrial line. This unit is accommodated in a house. Hence, the person is located off the unit. However, since it is necessary to connect the center station with the device through a terrestrial public line, such as an ISDN line, the terminal having a phone functional body and a microphone may be installed by the speaker so that the speaker may operate the terminal. The body may be connected to the terminal wirelessly in a manner to eliminate any connecting cable for simplifying the overall arrangement.

The center station can be arranged as an all-in-one type if it may be integrated as a speaking station selecting unit having a function of connecting and holding a line if a plurality of remote stations issue requests for speaking at the same time, selectively permitting one station to speak, and executing shut-off control of a feedback voice from the satellite. In this case, the remote station is required to provide the functions of receiving a voice control signal from the center station and performing the shut-off control of the voice.

Now, the description will be directed to a system arranged so that one center station interacts with a plurality of remote stations.

Figure 3:
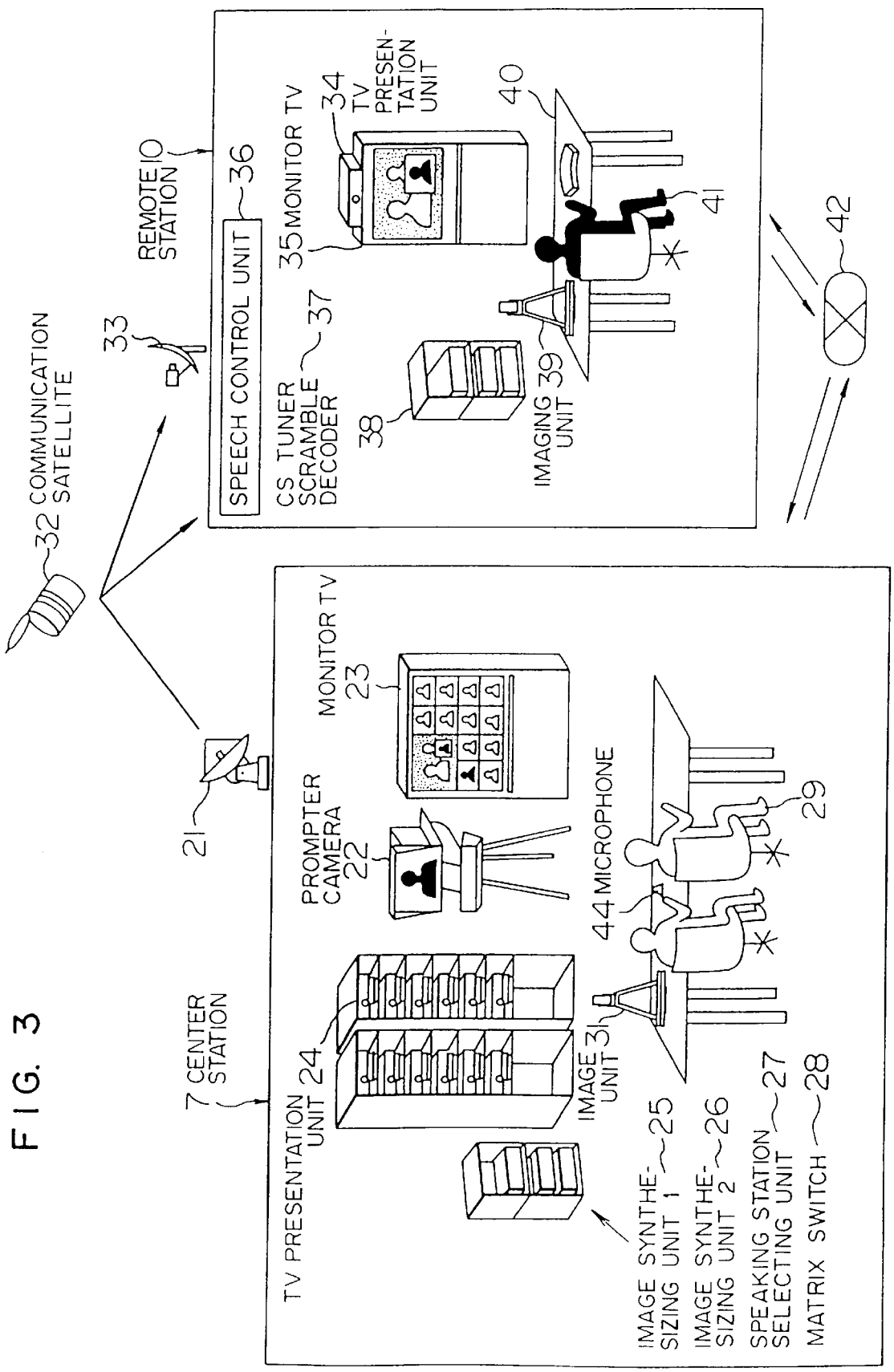
FIG. 3 is a schematic view showing a hybrid satellite communications system for concurrently connecting a plurality of remote stations and a center station according to an embodiment of the invention.

FIG. 3 shows an illustration of a system for connecting a center station with twelve remote stations at maximum through an ISDN (Integrated Services Digital Network) line.

Figure 5:
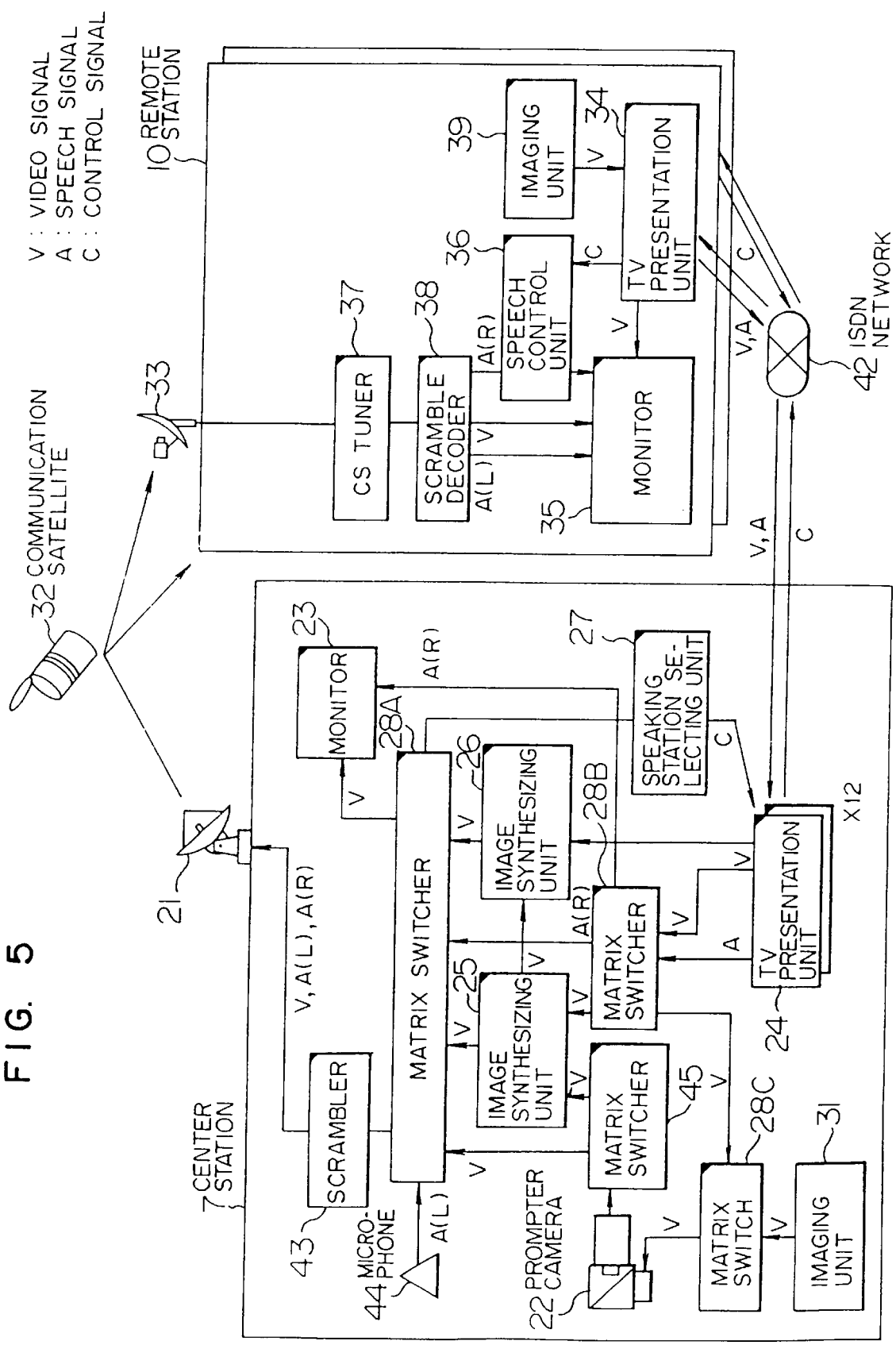
FIG. 5 is a circuit diagram showing the internal arrangement of the remote station and the center station.

FIG. 5 shows the details of the circuit configuration of FIG. 3. The center station 7 includes a teleconference unit 24 to be connected to the twelve remote stations 10 through a line, a prompter camera 22 serving as input and display means of an image, a microphone 44 serving as input means of sound, an image synthesizing unit 25 for synthesizing the video data of the center station with the video data of a remote station, an image synthesizing unit 26 for synthesizing the video data outputted from the image synthesizing unit 25 with the video data from the teleconference unit 24 on a screen, a monitor TV 23 for displaying the video data, a speaking station selecting unit 27 for switching matrix switchers and for shut-off controlling the feedback voice which is interlocked with the selection of any remote station, matrix switchers 28A to 28C for switching the input video data or speech data into any input data or output data and outputting the data, a scrambler 43 for encrypting the video and the speech data for broadcasting the encrypted data signal to the definitive remote stations, and a center station antenna 21 for transmitting the encrypted video and speech signals to the communication satellite 32. The limited broadcasting technologies disclosed in U.S. application Ser. No. 07/802,724, filed on Dec. 5, 1991, are applicable to the present embodiment and are incorporated herein by reference.

On the other hand, the remote station 10 is arranged to include a receiving antenna 33, a CS tuner 37 for receiving data sent from the center station, a scramble decoder 38 for decrypting the encrypted signal, a monitor TV 35 for displaying video and speech data, a speech control unit 36 for controlling the speech data to be supplied through the communication satellite on the basis of the signal sent from the speaking station selecting unit 27 of the center station, a teleconference unit 34 for effecting communication through the ISDN line, an operation panel 40, and an imaging unit 39.

In FIG. 5, V denotes a video signal, A denotes a speech signal, A(R)/A(L) denotes right/left channels of a stereo speech signal, and C denotes a control signal.

The terms "teleconference unit" or "TV presentation unit" as used herein refer to a combination of the camera 13, the monitor 14 and the microphone 17, as shown in FIG. 1. That is, the essential function of the teleconference unit is just to process the speech data and the video data.

Figure 4:
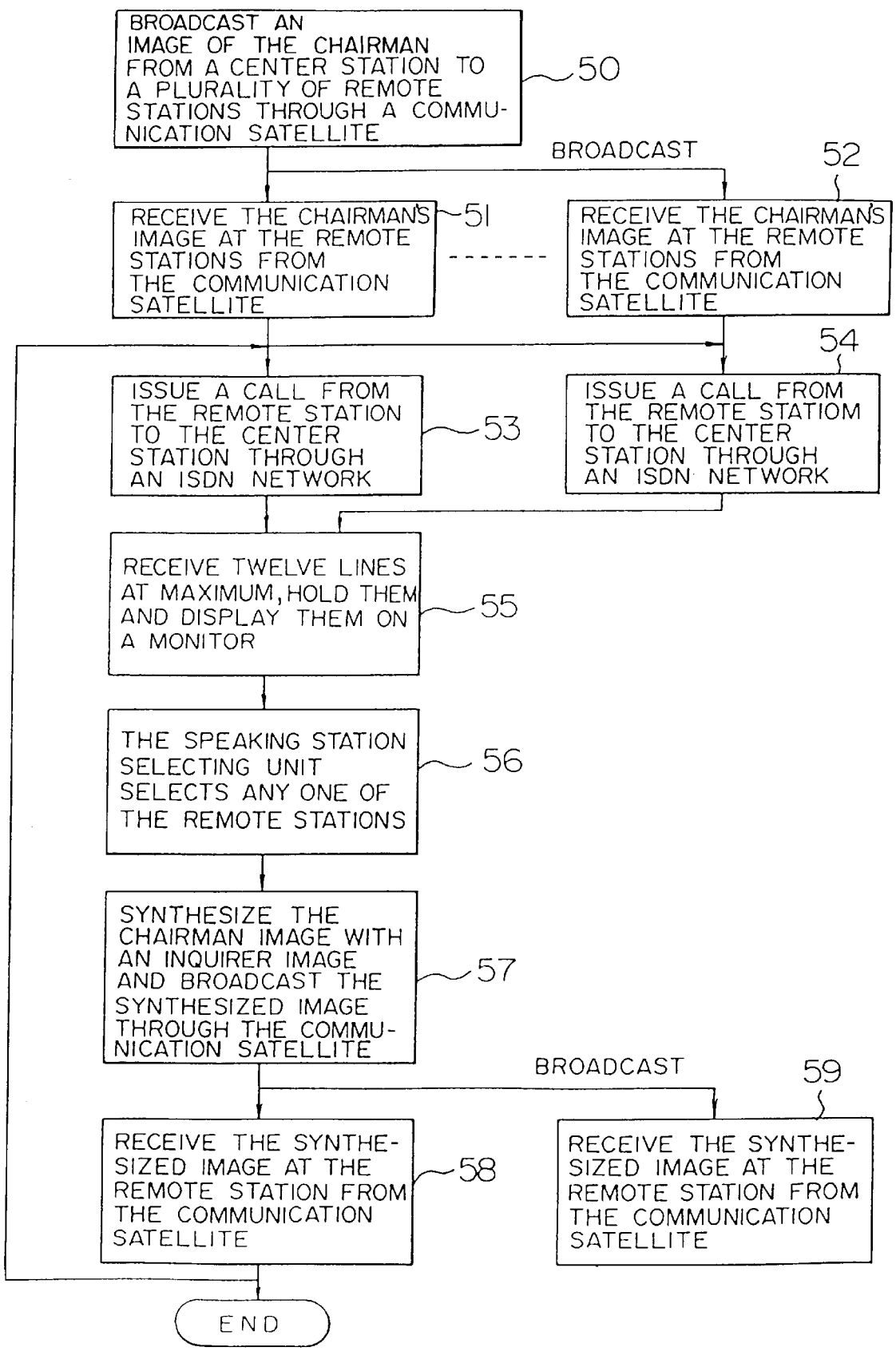
FIG. 4 is a flowchart for describing how the system shown in FIG. 3 operates.

FIG. 4 shows in flowchart indicating how this embodiment basically operates.

At first, the description will be directed to the broadcasting communication of data from a center station through a communication satellite while referring to FIGS. 4 and 5.

In the center station, the picture data, such as a manuscript input in the imaging unit 31, is displayed on the monitor of the prompter camera 22 through the matrix switcher 28. The prompter camera 22 picks up the image at the center station where the proceedings are conducted with reference to the manuscript.

The picked up image at the center station 7 is inputted to the matrix switcher 28 through an image distributor 45. The video data at the center station 7 is broadcasted through the center station antenna 21 and the communication satellite 32 to each remote station together with the speech data from the center station inputted from the microphone 44 after being scrambled by the scrambler 43 (step 50). At each remote station 10, the video signal and the speech signal are received through the antenna 33, the CS tuner 37 and the scramble decoder 38. The broadcast video and speech signals are received in the plurality of remote stations (steps 51 to 52).

Later, a video signal and a speech signal are required to be transmitted from the remote station to the center station. In this case, each remote station calls the TV presentation unit 24 of the center station by using the TV presentation unit 34 (steps 53 to 54) and becomes connected to the center station through the ISDN line 42. Assuming that twelve remote stations are connected to the center station through the ISDN line, the video signal of each remote station is sent to the image synthesizing unit 26 through the TV presentation unit 24 and is synthesized with the video data of the image synthesizing unit 25 which is picked up by the prompter camera 22. The synthesized image is inputted to the matrix switcher 28A and is displayed on the monitor television set 23 (step 55).

At the center station, the speaking station selecting unit 27 specifies any one remote station as being interlocked with the matrix switcher 28A (step 56). This specification is achieved by selecting any one the matrix switchers 28A to 28C and the TV presentation unit 24 in response to a control signal for selective control sent from the speaking station selecting unit 27. The image synthesizing unit 25 serves to synthesize the video data of the selected TV presentation unit with the video data of the prompter camera 22 as its child screen. The image synthesizing unit 26 operates to synthesize the video data output from the image synthesizing unit 25 with the video data outputted from each TV presentation unit 24. The synthesized data is broadcasted from the satellite (step 57). The broadcast video data is received by the remote station (step 58) in a manner to execute a TV interaction between the remote station and the center station.

The speaking station selecting unit 27 has a capability of selecting broadcast or monitoring with respect to each of the foregoing various synthesized images, the video data outputted from the image synthesizing unit 25, the video data outputted from the image synthesizing unit 26, the video data at the center station sent from the prompter camera 22, and the video data of each TV presentation unit 24.

On the other hand, the video data of the selected TV presentation unit 24 can be displayed on the monitor of the prompter camera 22 through the matrix switchers 28B and 28C. The arrangement at the side of the center station is just as shown in FIG. 3.

Herein, the operation of the matrix switchers 28A to 28C will be described in detail while referring to FIGS. 6 and 7.

Figure 6:
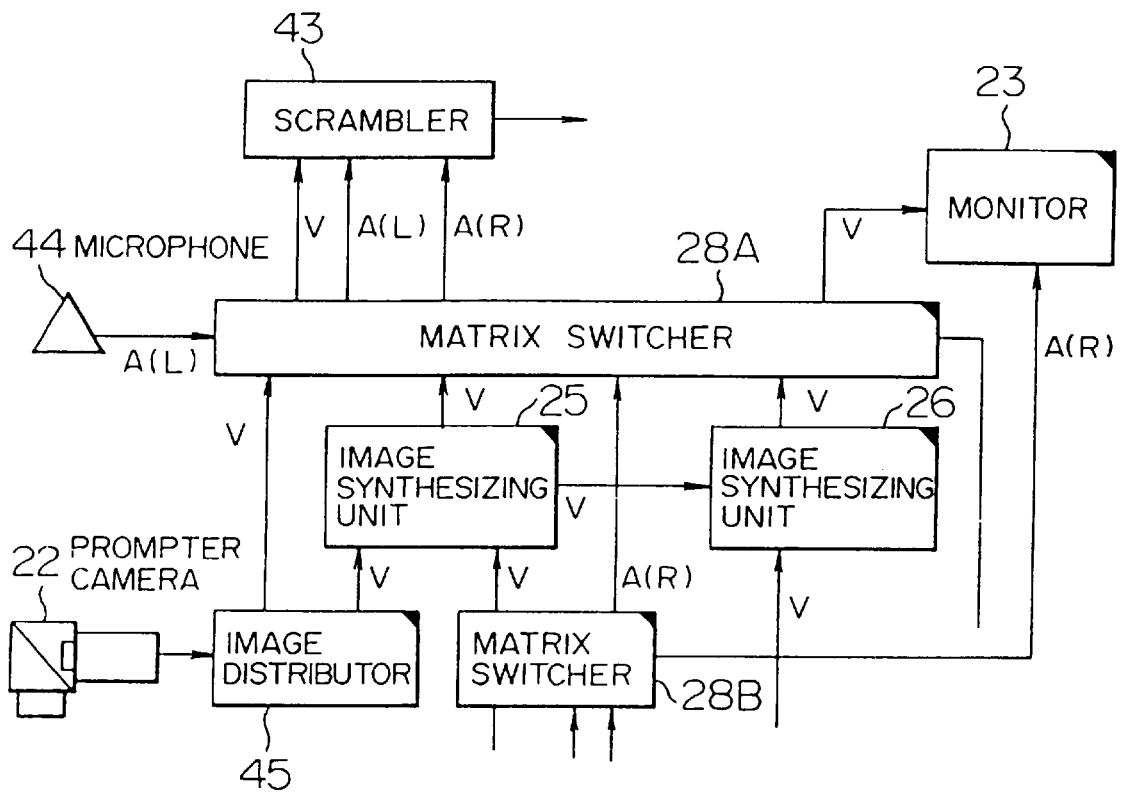
FIG. 6 is a circuit diagram showing an operation principle on which a matrix switcher and a scrambler provided in the center station operate.
Figure 7:
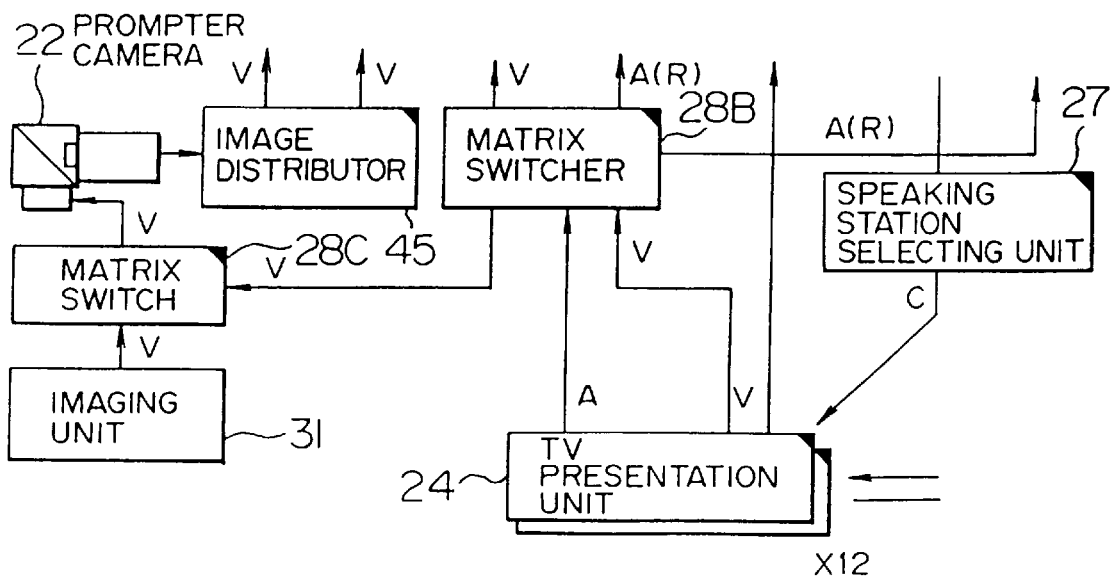
FIG. 7 is a circuit diagram showing a relation among a speaking station selecting unit, an operation panel and a matrix switcher.

FIG. 6 shows the principle on which the matrix switcher 28A operates. FIG. 7 shows the principle on which the matrix switchers 28B and 28C operate. In FIGS. 5, 6 and 7, the matrix switchers 28A to 28C are divided into three units for the convenience of explanation. What is required in essence is just one matrix switcher.

At first, a description will be given of how the matrix switcher 28A operates while referring to FIG. 6. In this embodiment, the data inputted to the matrix switcher 28A includes (1) the video data output from the prompter camera 22 and distributed by the image distributor 45, (2) the other video data distributed by the image distributor 45 and the video data synthesized with the video data of the remote station which is permitted to speak and is outputted by the matrix switcher 28B, the synthesis being executed in the image synthesizing unit 25, (3) the video data synthesized in the image synthesizing unit 25 and the video data synthesized with the video data of the twelve remote stations outputted from the twelve TV presentation units 24, the synthesis being executed in the image synthesizing unit 26, (4) the speech data inputted from the microphone 44, and (5) the speech data of any remote station which is permitted to speak and is outputted from the matrix switcher 28B. That is, three kinds of video data and two kinds of speech data are inputted to the matrix switcher 28A.

As an output of the matrix switcher 28A, one system of the video data and two systems of speech data to be applied to the scrambler 43 and one system of the video data to be applied to the monitor TV 23 may be referred to. Those systems are allowed to be outputted independently. Any of the video data (1) to (3) and the speech data (4) or (5) are allowed to be systematically selected.

Next, a description will be made of how the matrix switchers 28B and 28C operate while referring to FIG. 7. The matrix switcher 28B temporarily holds the video data and the speech data from the twelve TV presentation units 24. As mentioned above, in actual practice, the matrix switcher 28B is the same as the matrix switcher 28A. If, therefore, any of the remote stations is selected, that is, a remote station is permitted to speak by the speaking station selecting unit 27, the video data of the permitted station is outputted to the image synthesizing unit 25 and the matrix switcher 28C, and the speech data of the permitted station is outputted to the scrambler 43 while being interlocked with the operation of the matrix switcher 28B.

In actual practice, the matrix switcher 28C is the same as the matrix switcher 28A or 28B. Hence, the matrix switcher 28C serves to switch the video data of the imaging unit 31 into the video data of the remote station in a manner to monitor the image on the prompter camera 22.

As described above, the matrix switcher functions to switch the input video data or speech data into any input data or output data and to output the switched data.

In the basic system arranged to execute both the broadcast to be performed through the communication satellite and the communication through the terrestrial line, such as an ISDN line, it goes without saying that the present invention can be implemented without having to use the matrix switcher or with the use of different switching means.

The video data of the imaging unit 31 may be built into the video data and supplied as an output of the matrix switcher 28.

Description will be made of the send/receive function communication of the speech data in the interaction between the center station and a remote station.

The speech data of all the remote stations are inputted to the matrix switchers 28A to 28C together with the video data. Of them, only the speech data of the remote station selected by the speaking station selecting unit 27 is fed to the monitor TV 23 from the matrix switchers 28A to 28C.

The speech data of any remote station is transmitted to all the remote stations through the scrambler 43, the center station 7 and the communication satellite 32 together with the speech data inputted from the microphone 44 of the center station along with any one of the foregoing video data (which is not necessarily the same as the video data displayed on the monitor TV 23). This makes it possible for all the remote stations to receive the video and speech data involved in the interaction between the center station and any remote station which is permitted to speak.

In the selected remote station, however, since its own speech data is fed back through the center station 7 and the communication satellite 32, howling may take place and an unfavorable situation resulting from a signal delay on a satellite link may also take place. To overcome such disadvantages as howling, the speech data inputted to the center station and the speech data of any remote station are separated into L side channels and the R side of stereo sound used in the communication satellite in advance.

At the center station, the speaking station selecting unit 27 selects any one of the remote stations. At that time, the center station transmits a control signal to the TV presentation unit 34 of the selected remote station through the TV presentation unit connected to the selected remote station. In response to the control signal, the remote station operates the TV presentation unit 34 to control the speech control unit 36. If the center station transmits the speech data from the L (left) side channel of the stereo sound only, the speech control unit 36 cuts off the speech data at the R (right) side channel, that is, the return of the speech data of the selected remote station itself. This makes it possible to realize a smooth interaction between the center station and each remote station.

In the remote station shown in FIG. 5, the speech data inputted to the speech control unit 36 is transmitted from the R side channel of the stereo sound only. Instead, however, all the speech data, for example, the speech data at the R and the L channels may be inputted to the speech control unit 36 for selecting or cutting off any one of the speech data at the R and the L sides.

In the present embodiment, the identification as to whether the speech data is for the center station or for a remote station depends on the R side or the L side channel of the stereo sound. If the speech data can be identified, any means may be used for preventing howling in the remote station. The center station may have a configuration of the remote station to monitor the broadcasted video and speech data, for example.

According to the foregoing embodiment, a system is employed for transmitting an image of a speaker from any station, except the center station, to the center station on a terrestrial line, such as an ISDN line. Hence, each remote station may be a receive only type station. As a result, the total cost of the remote stations is reduced. Concretely, the cost of each ground station is about ⅙ as small as that of the conventional system. In addition, the system in which receive only type stations have been installed for another purpose may be expanded to a bidirectional system.

Further, the increase of a receive only type station and a TV phone or a TV presentation makes it possible to easily expand the network. As compared to the network connected through a terrestrial lines only, which limits the number of stations taking part in the teleconference, the present embodiment does not limit the number of the stations taking part in the teleconference and increase the operating cost.

The use of the prompter camera makes it possible to have a conversation while watching an image of an opponent. The resulting image becomes natural and as if all the participants are in actual discussion.

The prompter camera may be operated for its original purpose, that is, it makes it possible to display a manuscript thereon. Further, the same system configuration may apply to a different application rather than TV presentation, for example, an education application.

What is claimed is:

1. A satellite communication multipoint video signal transmission system, comprising:
   a center station;
   a plurality of remote stations;
   means, included in said remote stations, for transmitting request signals to said center station via a terrestrial line from said plurality of remote stations in an arbitrary sequence;
   means for receiving and buffering the request signals received from said remote stations in said center station;
   means for selecting one of video signals in said center station in response to said received and buffered request signals to produce a selection signal;
   means for transmitting the selected video signal via a satellite link as a center station video signal; and
   means, included in said remote station, for receiving said select signal from said center station via the terrestrial line to control reception of the video signal transmitted via said satellite link.

2. A multipoint TV interactive system utilizing a hybrid line of a terrestrial communication system and a communication satellite, comprising:
   a master station having first transmitting means for transmitting a video signal to said communication satellite to effect broadcasting of said signal from said satellite; and
   a plurality of slave stations having receiving means for receiving said broadcast video signal and second transmitting means for transmitting video signals from respective ones of said slave stations to said master station by utilizing said terrestrial line;
   said master station including:
      synthesizing means for synthesizing at least a video signal received from said respective ones of said slave stations and a video signal generated within said master station to produce a synthesized video signal and for supplying said synthesized video signal to said first transmitting means for transmission to said communication satellite;
   wherein said plurality of said slave stations are connected to said master station via the terrestrial line which is switched in sequence among said plurality of slave stations.

3. A multipoint video signal transmission system for use in a communication satellite, comprising:
   a center station including first transmitting means for transmitting to said satellite a signal formed by combining at least one video signal from said center station with a video signal and audio signal from a respective one of a plurality of remote stations such that said signal is broadcast from said communication satellite;
   wherein each of said remote station includes:
      means for receiving the broadcast signal,
      second transmitting means for transmitting a request signal from said respective ones of said plurality of remote stations to said center station via a terrestrial line, and
      means, responsive to receipt of a transmitted signal from said center station to the request signal, for controlling a video signal received via said satellite
   wherein said plurality of said remote stations are connected to said center station via the terrestrial line which is switched in sequence among said plurality of remote stations.

4. A center station in a satellite communication multipoint TV signal transmission system for interactively communicating with a plurality of remote stations units, comprising:
   buffer means connected to said plurality of remote stations through a terrestrial line for receiving and buffering communication request signals for communication with said center station from said plurality of remote stations;
   selection means for selecting the communication request signals buffered in said buffer means by utilizing a selection signal;
   imaging means for creating a TV signal corresponding to the communication request signal selected by said selection means;
   transmission means for transmitting the TV signal created in said imaging means from said center station in scrambled form and for broadcasting the TV signal to said plurality of remote stations via a satellite link; and
   means, responsive to said selection means, for transmitting a request select signal to a corresponding remote station via the terrestrial line to thereby control receipt of the broadcast TV signal.

5. A remote station coupled to a center station through a terrestrial line and a satellite line to communicate video information between said remote station and said center station, said remote station comprising:

transmission means for transmitting a request signal from said remote station to a buffer in said center station via said terrestrial line, wherein when said request signal is selected from said buffer by said center station by utilizing a selection signal, a request select signal is sent to said remote station through said terrestrial line;

receiving means for receiving video information corresponding to said request signal in scrambled form from said center station through the satellite line when said request signal has been selected from said buffer in said center station; and means for receiving the request select signal sent back from said center station through said terrestrial line, and for controlling said video information receiving means so as to secure receipt of said video information into de-scrambled form.

* * * * *